Oct. 24, 1939.  E. B. HESSER ET AL  2,177,342
METHOD OF COLOR PHOTOGRAPHY
Filed July 2, 1937  2 Sheets-Sheet 2

Inventors:
Edwin Bower Hesser,
Eva Louise V. Hesser,
By Richard Spencer
atty

Patented Oct. 24, 1939

2,177,342

UNITED STATES PATENT OFFICE 2,177,342

METHOD OF COLOR PHOTOGRAPHY

Edwin Bower Hesser and Eva Louise V. Hesser, West Hollywood, Calif., assignors, by mesne assignments, to Photocolor Corporation of America, a corporation of California Application July 2, 1937, Serial No. 151,552

5 Claims. (Cl. 95—2)

This invention relates to natural color photography. By the expression "natural color photography" it is intended to include all methods of color photography by which recordings are made of varied color sensitivities upon photosensitive material by means of light exposure in cameras, this invention providing improvements obviously recognizable as simplifying the making of color separation negatives by reducing the number of photosensitive elements it is necessary to expose in order to secure sets of printable color separation negatives in tri-color and quadri-color photography and cinematography.

This invention might be simply and adequately described as making possible the production of three color and four color separation negatives reproducing the substantially complete spectrum in their sensation recordings by means of cameras and optical devices ordinarily designed to make and capable of making merely two color separations as used in usual types of two color photography. The utilization of the principles herein disclosed make possible the correct production from the exposure of a two emulsion mono-pack film in such cameras of beam-splitting optical arrangement of both tri-color and quadri-color subtractive prints, by known methods, from the complete sets of color separation negatives produced. Similarly, a type of bi-pack disclosed herein makes possible in bi-pack cameras ordinarily producing but two color separations, the making of tri-color or quadri-color separations according to the same principles of selective copying which are a feature of this invention.

Production of color separation negatives, isolating the various recordable color sensations, is a well known art with many variations. The number of cameras, methods and devices for securing color separation records on photosensitive material is almost innumerable. All strive to obtain identical images differently filtered, using such artifices as successive exposure with differing filters, beam-splitters in the form of prisms and semi-transparent reflective surfaces, movable and revolving filters and, in cinematography, adaptions of all these devices together with the very common use of bi-packs. Each of these known methods may be definitely improved by the application of the principles of this invention, which, by bringing the essential emulsions into more direct physical contact at the moment of exposures tends to eliminate the flare, image distortion and softness which is a well known disadvantage in known methods, and particularly detrimental when three separate photosensitive surfaces, such as a tri-pack, or a combination of a single film with a bi-pack, are used to record the three essential sensation recordings of blue, green and red.

It has been known in the art of cinematographic photography for many years that the production of two color separations may be effected by the exposure on a single film of panchromatic type of an alternate succession of color sensations. Rotating screens with alternate green and red filters to produce respectively green record and red record separations were in use in 1912, and with many variations have since been utilized. Similarly, it is well known in the art that single or multiple prisms may be arranged in connection with the lens in photographing motion pictures, so dividing the light beam produced that by simultaneous exposure practically identical images of differing selective sensitivity, usually green record and red record, are produced upon a film. Variations of prism arrangement include devices by which multiple images appear upon one frame of a standard motion picture negative, whether film used is 8, 16 or 35 mm. Other types include the pulling down into exposure position of two frames instead of one, a prism dividing the light beam in such manner that a green record, covering one entire frame, and a red record, covering the other entire frame, are simultaneously exposed, the double pull down device handling an exposure of two frames as if it were one. In some of these double pull down cameras, the image is turned upside down in one of the separations. In another similar camera each image is in normal position, so that direct exposure may be made by well known additive methods. Two images on a single film frame may also be projected by additive methods through a prism color filter similar to that through which the picture was made.

In later years the simultaneous exposure of one film behind another, in the form commonly called bi-pack, has been used to similarly produce two color separation negatives, generally in green record and red record combinations for positive printing to as nearly as possible approximate the effects of three color photography. The great disadvantage of a rear film in a bi-pack being less sharp than the film nearest the lens in exposure is equally well known.

However produced, color separation negatives having the final result of but two records of differing selectivity cannot be made to produce correct three color photography, which may be defined as positive productions in viewable form correctly combining red, blue and yellow, or four color photography which includes these colors with the addition of black. Whether produced by prisms or other beam-splitting devices, such as semi-transparent mirrors, or by means of bi-pack, or rotational filter methods, insofar as is known, no practical manner has been devised which makes possible the production of tri-color and quadri-color viewable images by means of any of the known devices or methods generally employed for making two color recordings, whether in additive or subtractive processes.

These processes, generally speaking, have one thing in common, viz., the use of panchromatic material, to be effected by light filters, when the images formed are upon one film. In the case of bi-pack, the rear film is very generally a panchromatic emulsion controlled by a red filtrational color variously placed in the preeceding film. These arrangements are without novelty in the art, the sets of color separations therefrom being universally termed two color separations, and printing methods therefrom to obtain positive prints by subtractive processes being as well known as the additive projection methods. The terms negative and positive as herein used are readily interchangeable inasmuch as it is photographically possible and feasible to change any negative into a positive by the simple process of copying. It is equally possible to copy negatives in such a manner that a negative will result by one exposure of sensitized material in relation to the original negative, such production being effected by the use of self-reversing light sensitive materials.

The designation in this specification of "photographic film" generally includes all light sensitive photographic image producing materials whether supported by glass, Celluloid or self supporting. The term "emulsion" includes any layer or coating of light sensitive material capable of producing an image or contrasts by means of light exposure. The term "copying" embodies any operation by which an image is produced upon another photographic surface from any previously recorded photographic image. The operations of separating and copying emulsions or layers upon new independent negative material are called "selective copying". The term "nearest the lens during exposure" is synonymous with "first layer" of any superposed combination of photosensitive material, the succeeding layers in superposition thus being relatively farther, and finally farthest, from the lens during exposure or from the point of contact in contact printing without the use of a lens.

In the various types of films hereinafter described the term "mono-pack" is a coined term to cover a single transparent support for multiple emulsions in surperposed strata capable of making a complete color picture, no other film outside of the mono-pack being required to be exposed. The term "bi-pack" is well known in the art. The term "two color photography" designates known manner of producing two color separations. The term "beam-splitting devices" includes prisms, semi-transparent mirrors and their arrangement in conjunction with the lens in the operation of photographic exposure providing for the diversion of images to different sections or to different pieces of light sensitive photographic materials.

It is an object of this invention to provide a means for recording on a dual emulsion film, either mono-pack or bi-pack, the color records necessary for further processing to produce a positive print by subtractive methods in at least three colors. A further object is the provision of a method for producing a correct shadow sensation recording in brown or black from color separation negatives so produced. A still further object is the provision of a mono-pack film capable of taking the place of a bi-pack combination in cameras photographing simultaneously upon multiple film supported emulsions by optical methods. Another object is the provision of a method in natural color photography whereby bi-packs ordinarily adapted for two color work can be used for making three or more color recordings. An additional object is the provision of new and improved methods of color photography using new and improved types of mono-pack and multi-pack films. Other objects will appear hereinafter.

In its preferred embodiment, the method of color photography hereinafter more fully described, consists in the exposition in a camera of a dual emulsion film, either mono-pack or multi-pack, the emulsions having different color selectivities, and producing therefrom at least three color separation negatives. One of the more important objects and advantages accomplished by the invention is the provision of a method of color photography utilizing dual emulsion films which provides for three color recordings and a shadow sensation recording. One of the features of the invention is the discovery that an identical orthochromatic emulsion may be made to produce either blue or green sensation records, the blue record being produced when unfiltered, the green record when the exposing rays of light are yellow-filtered. Thus, in one form of this invention a single orthochromatic emulsion is used by means of beam-splitting or other alternation of filtered and unfiltered image exposure to record both blue and green records of the object being photographed.

A dangerous detriment to the success of known methods of color photography has been the amount of light, which might also be described as length of exposure, necessary to secure in the operation of photographing by exposure of photosensitive material within a camera of final color separation negatives of suitable density for color printing. In color cinematography it has been generally necessary to greatly increase the amount of light used on a motion picture set over the amount generally used in monotone cinematography. Such increase in light has proved not only an expense but a definite danger to the eyes and health of the players performing in such productions. This invention, taking this known disadvantage of color photography into consideration, provides for a much shorter exposure of photosensitive material than ordinarily necessary, that is, the reduction of lighting on a set. Compensating for this is the invariable use of intensification of photosensitive material after exposure, as used in this process. This operation has been made an important step in that the reversal of images and the whitening thereof has ingeniously been utilized in the further steps of selective copying to individualize the different color separation recordings upon independent supports; first recorded, according to one disclosure herein, upon a mono-pack film of only two emulsion layers, the final result may be four independently supported negatives printable, in positive form, in yellow, red, blue and black.

The invention particularly contemplates the usage of a single "mono-pack" film consisting of two emulsion layers supported by a single sheet of thin Celluloid, the emulsions being separated from each other by a thin colored layer acting as a filter at the moment of exposure and later being utilized in the operation of selective copying. The emulsion nearest the lens during exposure must of necessity be of an orthochromatic type which, when unfiltered, will produce a blue record negative recording, but which, when filtered with a yellow filter, will produce a green record. The associate emulsion, farthest from the lens during exposure, must be a red recording emulsion. The manner by which a complete series of color separation recordings may be accurately produced by this means will be in detail disclosed.

A preferred type of mono-pack is as follows in the order nearest the lens during exposure: A Celluloid support, an orthochromatic emulsion of blue sensitivity unfiltered and green sensitivity when yellow filtered; a gelatin filter water insolubly dyed yellow; a red sensation recording emulsion.

Another preferred type of mono-pack is as follows in the order nearest the lens during exposure: An orthochromatic emulsion which unfiltered is blue sensation recording, but when yellow filtered is green recording; a gelatin filter layer water insolubly dyed yellow; a red sensation recording emulsion; and a transparent support.

Another suitable form of mono-pack is as follows: A Celluloid support, an orthochromatic emulsion of blue record selected sensitivity when unfiltered but green recording when affected by a yellow filter; a gelatin layer water insolubly dyed red; a panchromatic emulsion.

A still further form of mono-pack suitable for this purpose is as follows: An orthochromatic emulsion which unfiltered records blue sensations and when yellow filtered is green recording; a water insolubly red colored gelatin filter layer; a panchromatic emulsion; and a transparent support.

The foregoing types of film may be used in any type of camera, whether motion picture or still, for the production of a two color separation record in ordinary form, or in any type of split-beam camera producing identical multiple images simultaneously for ultimate tri-color or quadri-color positive printing. In such multi-beam cameras the filtrational arrangements would be altered to provide one beam unfiltered and one beam yellow filtered in exposure; moving filter cameras should provide one exposure unfiltered, alternate exposure yellow filtered.

It is apparent that the use of a light yellow filter, on one beam in multi-beam camera exposure, and no filter whatever on the other beam, provides a greater saving of light than the known usage of green and red filters. It is also certainly apparent that the ability to photograph in tri-color or quadri-color separations resulting in a camera designed only for two color separation negative production is an improvement of marked value in the art.

In addition to this first intrinsic saving of light, i. e., the ability to produce negatives with less light yet of proper exposure, because of the elimination of the heavier filters known and necessary in ordinary two-color photography, this process, in its methods of development provides even greater ratio of speed and light saving, in its feature of intensification of negative material after development, this operation of intensification being important in the processing. While intensification, in itself, is and has been known for many years, in the correction of underdeveloped and underexposed negatives, its regular use in color photography, for the increasing of photographic speed and production of a positive image to facilitate optical copying for the production of negatives from an actual negative in a single operation is obviously new, novel and an improvement in the art. By this means it is actually possible to produce correctly exposed color separation records, suitable for positive printing in tri-color or quadri-color by subtractive methods, as readily in point of light for exposure as in black and white work.

The method of development and copying are subject to considerable variation, depending to a large extent upon the type of camera utilized and the placement of the colored images of varied selective sensitivities upon the light sensitive photographic material employed. In this respect again there is a differentiation of treatment depending upon the type of film exposed. In general, the first operation of development is carried out in the ordinary manner, great care being taken not to over develop the film, because subsequent steps deal with intensification methods. Following this first development, in quadri-color work and while the negative is still thin and not intensified, a positive master print in black is taken from combination of green record and red record negatives in supersition by contact printing on panchromatic stock which is not affected by the interlying filtrational layer between the two emulsions. This master print, in black, is utilized in quadri-color work as a black key print, representing a correct shadow sensation recording.

Following this contact copying operation the film is immersed in an intensifying solution which may be as follows:

|  | Ounces |
|---|---|
| Mercuric chloride | 2 |
| Potassium bromide | 2 |
| Distilled water | 64 |

This treatment has the effect of turning the silver, forming the silver images into a complex salt of silver chloride and mercurous chloride which is white in color and is an actual intensification or building up of the contrasts priorly showing in the film as a negative. The negative images have now been turned to positive. Other known methods in the photographic art by which negative images are reversed to white positives, such as the tin-type solutions known for over an hundred years, may be utilized, as may also solutions containing mercuric iodide. This whitener of images employed after developing, fixing and washing permits the copying of images from both sides of a negative when there is a dark layer in between them. While preferably the shadow sensation recording composed of the dual red record and green record emulsions, as a unit, or the red record and blue record emulsion, as an alternate unit, should be taken from the developed and fixed negatives before intensificational whitening by contact printing, as previously described, it is often advisable to immerse the negative as a whole in the intensificational whitening solution following the operations of developing, fixing and washing, without the intermediate step of drying. In this case, after drying of the intensified images, the shadow sensation record may be similarly taken upon panchromatic material by contact printing or by optical printing with the light in the rear of the film, the dual whitened images, while visually positives, by reflected light, being still negatives by transmitted light. The combination of red record and green record whitened images, or the combination of red record and blue record whitened images are each satisfactory for the production of a shadow sensation black key printing recording.

Other features of the invention will become apparent from a reading of the following description in the light of the accompanying drawings in which.

The arrow in each figure indicates the direction of the light rays entering the film during exposure.

Figure 1:
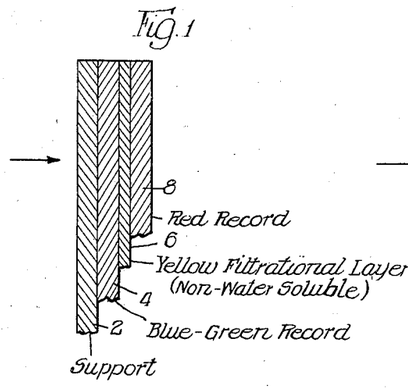
Fig. 1 represents a mono-pack film in which the Celluloid support faces the lens, followed by a blue-green record emulsion, a yellow filtrational layer and a red record emulsion.

Referring to Fig. 1, the one form of film illustrated comprises as one mono-pack element a transparent support of glass or Celluloid 2, an orthochromatic emulsion 4, a yellow gelatin film layer 6, non-water-soluble but preferably soluble in aqueous sodium hydrosulphite, a red sensation recording emulsion 8.

The object in natural colors is photographed on this film with the light rays entering the film in the direction of the arrow, as indicated. The unfiltered portion of light rays entering the film will so affect the orthochromatic emulsion 4 as to make it blue sensation recording. When the light rays entering the film are yellow filtered, this orthochromatic emulsion 4 becomes green sensation recording. As will be shown, this invention depends upon substantially identical images, alternately filtered and unfiltered, and therefore, alternately blue recording and green recording, thereby, in conjunction with the red record emulsion 8, producing when copied separate records of three colors, and when either the blue and red record, or the green and red records, are used as a dual combination, for copying by transmitted light, a fourth or shadow sensation recording correct for positive key printing in black.

Figure 2:
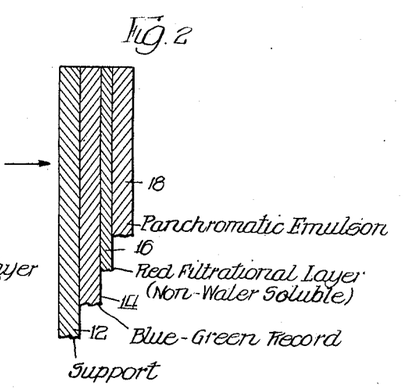
Fig. 2 represents a mono-pack film in which the Celluloid support faces the lens, followed by a blue-green record emulsion, a red filtrational layer and a panchromatic emulsion.

In Fig. 2, the mono-pack film represented comprises a Celluloid support 12, and orthocromatic emulsion 14, blue record when unfiltered, green record when yellow filtered, a red gelatin non-water-soluble filtrational layer 16, a panchromatic emulsion 8.

Figure 3:
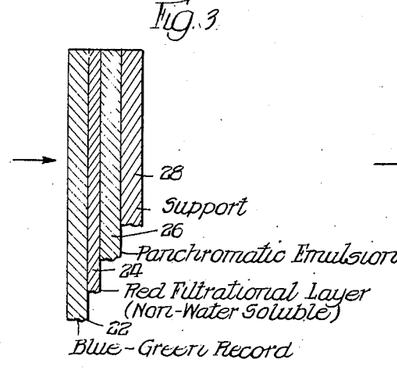
Fig. 3 represents a mono-pack film in which the first layer, nearest the lens, is a blue-green record orthochromatic emulsion, followed by a red filtrational layer and a panchromatic emulsion.

Fig. 3 represents a mono-pack which, instead of permitting the light to enter the film through a Celluloid or other transparent support, as in Figs. 1 and 2, is so arranged in relation to the focused bundle of light rays entering the camera from the lens that the light first strikes the orthochromatic emulsion 22, passing through a red filtrational layer 24 to the panchromatic emulsion 26, making a red sensation recording by the action of the red filter layer 24, the combination being supported by the Celluloid or glass support 28.

Figure 4:
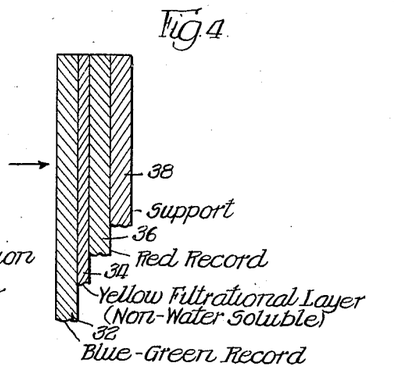
Fig. 4 represents a mono-pack film in which the first layer, nearest the lens, is an orthochromatic emulsion of blue-green sensitivity, followed by a yellow filtrational layer and a red record emulsion.

Fig. 4 illustrates another mono-pack in which the orthochromatic emulsion, blue and green sensation recording if not filtered, or green sensation recording if yellow filtered, is shown by number 32, a yellow filtrational layer of gelatin, the color content being non-water-soluble 34, a red record emulsion 36 and a transparent support 38.

Figure 5:
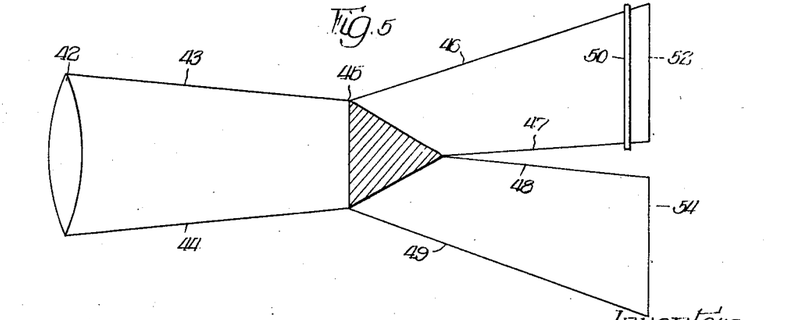
Fig. 5 diagrammatically represents a camera of prismatic split-beam type.

In Fig. 5, the split-beam prismatic camera diagrammatically illustrated comprises a lens 42, a prismatic beam-splitting device at 45, a photographic element or film at one focal point 52, and another photographic element or film at the other focal point 54. The light rays entering the camera and passing through the lens are designated by the lines 43—44 before entering the beam-splitter, after, division lines 46—47 represent one portion of the divided rays, which pass through a yellow filter 50 before falling upon the light sensitive photographic element at 52. The other division of the light rays, unfiltered, indicated by lines 48—49, falling upon the photographic sensitive film at 54. Thus, in all the films of the types illustrated in Figs. 1, 2, 3, and 4 the exposure at 52 would cause the orthochromatic emulsions to be strictly green sensation recording because of the yellow interposed filter 50, while the exposure of the same film at 54, unfiltered, would be blue sensation recording.

Figure 6:
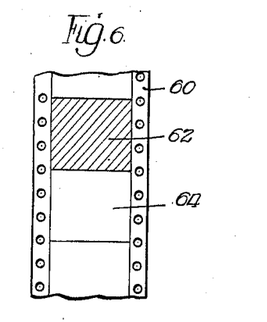
Fig. 6 diagrammatically represents a double motion picture frame in which one frame is unfiltered, and the other yellow filtered, in the pathway of split focused light rays.

Fig. 6 diagrammatically represents a double frame of a motion picture film, produced by the known method of "double pull down" in the camera mechanism, permitting the insertion of a filter between the lens and one of the images, in this instance, allowing the other image to be exposed unfiltered. The film is represented by 60, the filtered image in one frame by 62 and the unfiltered image by 64.

Cameras producing separate images of differing selective sensitivities upon two adjoining film frames are not new or novel. It has been the custom in two color work with panchromatic film to so filter the light beams that one was affected by a green filter to become green sensation recording, the other by a red filter to be red sensation recording. Such cameras, already in existence, may be utilized without change except for the elimination of the red and green filter elements, and the substitution of one yellow filter element as diagrammatically shown in Fig. 5, number 50, the exposure at 52 corresponding to the filtered result illustrated in Fig. 6, numbered 62.

Figure 7:
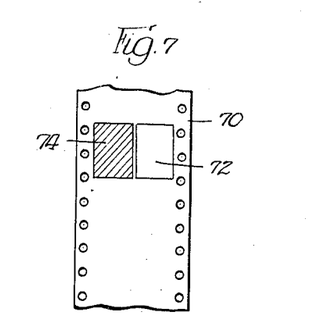
Fig. 7 diagrammatically represents two images, directionally reversed, representing differently filtered sensitivities, upon a single motion picture frame.

Fig. 7 diagrammatically represents the film product of another well known type of motion picture camera in which a prismatic device splits the beam, placing it in divided upright position within the single frame of a motion picture film, the film being represented by the numeral 70, the unfiltered portion 72, and the portion comprising one complete image, yellow filtered 74, the system used being the same as previously illustrated, and the photosensitive elements one of the films represented in Figs. 1, 2, 3 or 4.

Figures 8, 9, 10:
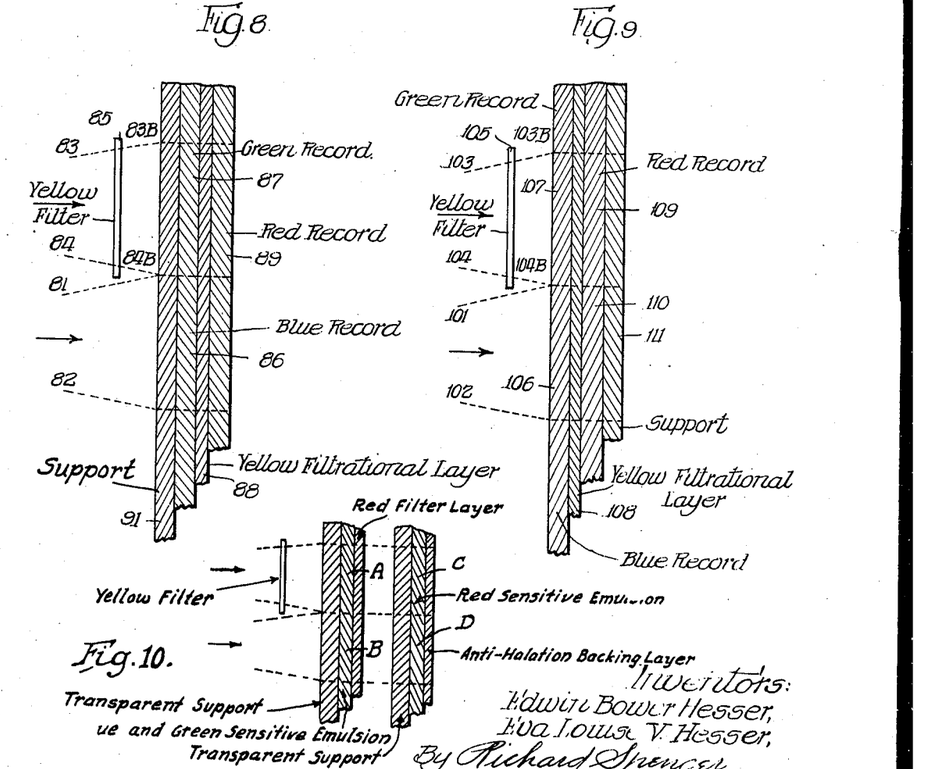
Fig. 8 represents, in diagrammatic profile, twin images produced by prism camera on the same film, one image unfiltered, the other filtered, showing the differing sensitivities and contrasts recorded.
Fig. 9 similarly illustrates another type of film, with twin images, and the recordings of differing selective sensitivities thereon.
Figure 10 illustrates the application of the invention to a common form of bi-pack, namely, "Du-Pac".

In Fig. 8 there is a representation of a profile view of films as represented in Figs. 1 and 2, the Celluloid support nearest the lens during exposure being indicated by numeral 91, the focused bundle of light rays, one unfiltered the other yellow filtered, being diagrammatically represented, the yellow filter 85 being interposed in the pathway of light rays 83 and 84 so that when they reach the film at 83B and 84B they penetrate through the clear Celluloid support 91, reaching the next layer, the orthochromatic front film characteristic of this invention. Similarly, the unfiltered rays indicated by 81 and 82, when reaching the film at 81B and 82B penetrate the Celluloid support, next reaching the orthochromatic film. At the point where these unfiltered rays strike the orthochromatic film 86 the recording is of blue and green sensations only. Where the yellow filtered rays strike the orthochromatic film in the portion designated by 87, the recorded sensations are green. The rays must next pass through the filter layer 88 to reach the red recording emulsion which correctly records red both in the portion 89, in which a yellow filter was interposed in the source of focused light rays before reaching the film, and in the portion 90 in which no such yellow filter was interposed. The filter layer 88 is red when the layer farthest from the camera is a panchromatic emulsion, as in Fig. 2, or yellow when the most distant emulsion is a direct red record type, necessitating a yellow filter. In other words, the second layer is effectively sensitive to red only.

It is thus apparent that the section of the film designated in Fig. 8 by the numeral 86, being the unfiltered orthochromatic, provides, by copying, the blue record necessary for tri-color or quadricolor set of separation negatives. Section 87 of the film, with interposed yellow filtration, provides the green record. The section of rear emulsion 90, unfiltered except for its directly preceding filtration layer 88, provides the red record, by copying, while a combination of orthochromatic and rear red record emulsions of one image provides, by transmitted light copying, the shadow record necessary for black key printing.

Fig. 9 represents in profile view and diagrammatically the films as illustrated in Figs. 3 and 4, exposed by means of a split-beam camera, in which the unfiltered light rays first enter the film at points indicated by lines 101 and 102, forming in the portion of orthochromatic film designated by 106, a blue sensation record. The light rays entering the film through the yellow filter, 105, are designated by the lines 103 and 104 which, first reaching the mono-pack at 103B and 104B, form in the section of the orthochromatic front film affected by the yellow filter, and designated by numeral 107, a green record. These light rays, passing through the filter 108 form red records in the sections of the rear film designated by 109 and 110, the recorded values being identical as to color, but weaker in exposure in the section 109 affected by the interposed yellow filter 105. As shown in Figs. 3 and 4, this type of film permits the use in the rear emulsion of either direct red record film or panchromatic film made red recording by a preceding red filter. In either case the dual combination of red record and blue record, or of red record and green record may be copied by transmitted light on panchromatic material to obtain correct shadow sensation recording for black key printing in quadricolor positive manufacture.

It is obvious that the same film may be used in cameras with rotational filters in which alternation of filtration is provided. In such cameras one exposure would be unfiltered, and the other exposure yellow filtered. The difficulties of all alternately filtered film separations have been the jump, or flicker, caused by alternations of filtration. In cameras where exposure can be made at the rate of 48 frames per second, using this type of film and copying processes disclosed herein, flickerless and fine quality sets of color separations may be made in the identical manner as illustrated in Figs. 8 and 9, depending upon types of film used, but in any case taking from the filtered portion, as in Fig. 9, behind the yellow filter 105, the series of selective sensitivity copies necessary for green sensation, red sensation and shadow sensation recordings, thus providing from the yellow filtered frame of the film being exposed in rotating camera the negatives necessary for positive printing in red, blue and black, the section 107 being the green sensation record used for red printing, the section 109 being the red record used for blue printing, and the section comprising the dual emulsions, indicated by 107 and 109, being copied by transmitted light to produce a black or shadow record. Obviously all of these being from the identical frame are in perfect and complete register. From the unfiltered orthochromatic section 106 a blue record is obtainable for the yellow printing, obviously not in as perfect and absolute register as the three separations taken from the filtered portion of the negative, but because of the yellow being least important in definition of all of the colors, providing a source of this color entirely satisfactory in commercial usage, the error between exposures being so slight as to be negligible. The film itself provides in its three main separations not only absolute registration but the speed required for projection and sound coordination. The problem of running 48 frames through a camera in this day of high motion cinematographic cameras is of very little difficulty. Such exposure is definitely new and novel, having many great benefits in that the use of beam-splitters or prisms is entirely eliminated.

Similarly, in beam-splitting cameras where three films are regularly used to produce a set of tri-color negatives by a single exposure, behind a green filter to obtain a green sensation negative and a bi-pack exposure utilized to obtain blue and red record negatives, the mono-pack film as outlined in this invention, together with methods of processing, may be used to supplant the bi-pack. This single mono-pack, entirely unfiltered, will produce by processing as herein described blue record and red record senation negatives and by the dual use in transmitted light copying of the associated superposed red and blue records, a shadow sensation record suitable for black key printing. In cameras which produce from exposure of bi-pack their green and red records, and simultaneous exposure through split-beam in another exposure placement of the camera a separate blue record, one of the films described in Figs. 1, 2, 3 and 4 may be substituted for the bi-pack and with the insertion of a yellow filter, the mono-pack film thus provided will be copyable to supply green sensation, red sensation and an additional shadow sensation recording through the dual use in copying by transmitted light of the associated dual green record and red record emulsions. These, in conjunction with the separately exposed blue record will provide negatives for quadri-color positive printing. Minus the operation of transmissional copying to produce shadow sensation record, a tri-color set of negatives is obviously produced.

In modern motion picture production much work is being done in two color, produced in two color separation negatives by the use of bi-packs which are standard in manufacture and sale on the open market, such bi-packs generally consisting of a single orthochromatic emulsion, red filter coated, on the front element and a rear element of panchromatic film. The orthochromatic front separation produced is generally used for positive printing in a suitable shade of brick-red, orange-red or the like to harmonize with a shade of blue, blue-green or green, printed from the rear, red record panchromatic emulsion.

Motion pictures so produced can only be printed correctly and scientifically in two colors, and the effect of natural color so obtained is obviously only approximate, no true yellows or true shades of purple being producable in the same printing combinations.

While the detailed discussion thus far has been concerned principally with a method of color photography using mono-pack film, the method of alternate exposure to unfiltered light and yellow filtered light previously described is applicable to bi-packs containing a single orthochromatic emulsion on the first elements.

One such bi-pack is "Du-Pac" in which the front element consists of a transparent support, an orthochromatic emulsion of green-blue sensitivity, and a red filter layer removable after development in dilute sodium hydrosulfite. The second element consists of a panchromatic emulsion on a transparent support, optionally containing a non-halation water-soluble backing layer of a dark color.

The application of the invention to this type of bi-pack is illustrated in Figure 10 in which two regions of the bi-pack are exposed, the one through a yellow filter and the other unfiltered, thus recording latent images in the first layer or emulsion at A and B and in the second layer or emulsion at C and D. The first emulsion, as previously indicated, is sensitive to blue and green, while the second emulsion carried on the rear element of the bi-pack is a panchromatic emulsion which, in view of the red filter layer carried on the back of the first element of the bi-pack, is effectively red sensitive only. That portion of the spectrum recorded in region A we have found to be suitable only for printing in magenta, while that portion of the spectrum recorded in region B we have found to be suitable for printing in yellow. Those portions of the spectrum recorded in regions C and D are suitable for printing in blue. Thus, in accordance with this invention, using an ordinary type of bi-pack, we are able to obtain recordings of color part images suitable for printing in magenta, yellow and blue. It might not be expected that both a yellow printer negative and a magenta printer negative could be obtained from the front element of a bi-pack in this manner, but we have found such to be the case. In spite of the fact that the orthochromatic emulsions employed on the front elements of bi-packs are commonly referred to as having blue-green sensitivity, the green sensitivity does not interfere substantially with recording of the blue sensitivity, making it possible to record on such a front element of a bi-pack when unfiltered a portion of the spectrum suitable for printing in yellow, and when filtered with a yellow filter, a portion of the spectrum suitable for printing in magenta.

A novel type of bi-pack for use with alternate unfiltered and yellow filtered light as herein described consists of a front element having an orthochromatic emulsion on a transparent support, the light rays reaching the emulsion through the support. This single orthochromatic emulsion without any filtration layer thereon is the only layer on the support of the first element of the bi-pack. The rear element consists of a single panchromatic emulsion coated upon its face with a red filtrational layer, this layer and its associate emulsion being in contact during exposure with the front element and its single orthochromatic layer.

If this bi-pack were ordinarily exposed, it would result in a front emulsion producing, when developed, a mixed blue-green record, and a rear emulsion red record, sufficient for two color printing only. By exposure of this bi-pack in a camera providing alternation exposure as taught in this application, one image is filtered with a yellow filter, producing a green sensation image upon the orthochromatic front emulsion. The alternate image is unfiltered, producing a blue-green image upon the alternate frame or section of a frame. The rear panchromatic emulsion exposed in association produces always a red sensation image, but of lighter quality through the filtered image portion of the exposure.

With alternation of exposure of bi-packs as above described, three or four color results can be obtained without any "selection copying" methods whatever. That is, in copying, or "taking off" the final master print negatives, no operation of intensifying or whitening the emulsions is necessary, although intensification can be employed if desired. On the front element after exposure, there is alternation of blue and green records which can be copied by an "alternate exposure printer", i. e., print one frame, skip one frame, for example, to obtain the blue record on a separate independent film, then re-set the machine for green record similarly made. On the second element are the two red records almost identical except that the yellow filtered exposure is lighter in density. The heavier exposure, therefore, is copied onto a new emulsion by similar skip-frame printing. Shadow sensation recordings can be made by copying a combination of any two images.

One of the further features of this invention is the provision of a brown shadow sensation recording. Such a recording is made from the blue and green sensation images in combination, e. g., copying by transmitted light.

For some purposes, the following new and improved bi-packs may be used without alternate exposure:

1. A bi-pack in which the first element provides for exposure through a Celluloid or other transparent support, the light first meeting a photosensitive surface in the form of a blue orthochromatic record layer which is followed by yellow filtrational layer (non-water-soluble but soluble in sodium hydrosulfite solution) and another orthochromatic layer which, under the influence of the preceding yellow filtrational layer, is green sensation recording. The second element of the bi-pack is arranged to touch the first element at the moment of exposure. The first layer of the second element consists of a red filtrational substance (water-soluble or insoluble, or insoluble but removable by sodium hydrosulfite solution) followed by a panchromatic emulsion which, under the influence of the preceding yellow and red filter layers is red sensation recording. This emulsion is affixed to a transparent support which is preferably followed by a non-halation filter layer.

2. A bi-pack similar to that above described except for the character of the red record emulsion, the red selective sensitivity of which is colored by the presence of integral sensitizing dyes. In this bi-pack the transparent support nearest the camera lens during exposure is followed by an orthochromatic emulsion which is blue recording. The latter is followed by yellow filter layer and a green recording orthochromatic emulsion. The second element consists of a red recording emulsion operating under the influence of the yellow filter in the first element affixed to the front of a transparent support which is provided with a non-halation backing.

3. A bi-pack similar to the first bi-pack described above except for the placement of the red filtrational layer on the first element instead of the second element. In the order nearest the camera lens during exposure, this bi-pack consists of a transparent support for the first element, an orthochromatic emulsion for blue recording, a yellow filtrational layer, an orthochromatic emulsion for green recording under the influence of the yellow filtrational layer and finally to complete the first element an overlaid preferably water-soluble red filter layer. The second element consists of a panchromatic emulsion on a transparent support which has an anti-halation backing. An improvement in the elimination of flare which does away with the necessity of the anti-halation coating entirely is provided by coloring the Celluloid support behind the panchromatic emulsion. Such coloring of the rear Celluloid support may be in any dark color such as red, orange, yellow, green, blue or violet. The panchromatic emulsion which is red recording may then be readily copied by the method of whitening using reflected light, or it may be copied by transmitted light upon a panchromatic material which would not be affected by the proposed coloring of the transparent support. Such colored transparent supports can equally be used with improvements in photographic effectiveness in any of the bi-packs herein described.

Instead of a red filtered panchromatic film as the second element of the above bi-packs, it is possible to use a red recording emulsion made so by self-contained dyes. In this case, the filter can be omitted.

The new types of bi-pack films just described are especially suitable for making a brown key negative from the combination of superposed green sensation and blue sensation records which form the emulsions upon the front element of the bi-packs. This may be done in a manner similr to that described for making an essentially black key recording from either the green and red or the blue and red emulsions of the mono-pack, e. g., the images in the front element of the bi-pack may be intensified by whitening as previously described and then photographed in an optical printer upon negative material by transmitted light, or a contact print may be obtained from the blue and green images combined. The negative or positive thus produced is scientifically correct for brown key recording because brown is largely a combination of red and yellow, the two colors positively printed from green and blue sensation records. The further darkening which comprises the brown in addition to red and yellow is of blue-black origin. Brown key printing has advantages over black key printing in motion pictures. The black printing plate has often proved a detriment by so darkening the projected picture upon a motion picture screen as to make viewing thereof difficult, particularly by large numbers of people in an audience whose vision is not completely perfect. Such persons often prefer the more easily viewable black and white monotone productions to those with color because of the greater brilliancy and easier viewing qualities generally possessed in monotone projected prints. The brown key print in motion pictures gives a warm viewable picture on the screen containing all of the necessary sharpness and depth essential to practical success.

The method of selective copying of the images of the dual emulsions most preferred is the use of an optical camera, as is generally used in motion picture laboratories for optical printing, the usage of this instrument being well known in the art and extending back, in actual practice for a period exceeding twenty years. In most optical cameras, the source of illumination is from the back of the film being copied, that is to say, transmitted light is used to copy an image on one film to another film, the movements of the two films, the copied and the copier, being controlled by simultaneous movement governed by motion picture sprockets, it being general practice to utilize two synchronized motion picture cameras for this purpose. In the present process the same form of transmitted light is used in copying dual emulsions as one to produce a composite shadow record.

The use of transmitted light is also preferable in the operation of copying a transparent support bearing dual images superposed, when the density of one of the images from a standpoint of photographic contrast has been made negligible by the application to one side of the film, without touching the other side, of a bleach which temporarily or permanently reduces the contrast of the image affected by contact with the bleach, leaving unimpaired the contrast and density of the associate image on the other side of the film or separational layer of gelatine. Transmitted light in an optical camera printer may also be utilized in copying an image which is supported by a transparent support colored deeply for anti-halation purposes; in such a case a panchromatic material is used for the copying film by transmitted light.

Copying of whitened images by whatever manner the whitening is produced, is readily accomplished in an optical printing camera by means of reflected light, which, in simplest form, means the simple photographic process of photographing a photograph. The whitened image, being a positive, is readily converted into a negative by such copying operation. This is similar to the placement of an old-fashioned tintype with its whitened image, in front of any camera and photographing it. The image thus obtained is a negative from which any number of positive prints might be made. In such a photographic operation with a tintype, there is no hindrance to the making of an image larger or smaller on the negative produced. This also applies to the workings of an optical printer camera, which has the ability to convert a smaller sized image into a larger, or vice versa. In instances where the alternation of green and blue records is shown on the exposed mono-pack, the optical printer must of necessity first copy in sequence all of the blue record exposures by known methods of alternation, following this with copying of the green records, in sequence and the red record from the series of frames chosen as the most suitable from the standpoint of density and clarity of image. When, as in some optical arrangements, the image of one group is inverted due compensation is possible in the known forms of optical printers. Also, when images are side by side in one motion picture frame and thus reduced in size, by means of an optical printer they are readily converted into standard sized motion picture frame negatives. Copying of images containing various color image records against an artificially supplied background of darger color, as for instance, dye immersion of negative in such manner that gelatine content but not the images are colored, provides another feasible method for the use of an optical printer camera in copying operations.

In the previous description, most of the mono-pack and multi-pack dual emulsion films are described as having filtrational layers, water-insolubly dyed. For instance, the mono-pack films and the dual emulsion films of certain of the bi-packs previously described have non-water-soluble yellow filtrational layers. According to this invention, a water-soluble yellow dye may be used in these filtrational layers instead of the water-insoluble yellow dye provided another method of copying is employed. After development, the dual emulsion negative is fixed in the ordinary manner and copied to obtain the shadow sensation negative from the two different superposed associated emulsions of, say, blue and red sensitivities, or blue and green sensitivities, or green and red sensitivities, according to the film combination employed. This copying is by transmitted light through the film, as if it were an ordinary single emulsion negative. The negative at this point, to an ordinary inspection, is just a normal negative. The next step is to quickly dye this negative in a very strong blue acid dye, for example, an acid aniline dye. The blue dye has the effect of dyeing to a blue color the complete structure of gelatine bearing the silver images as haloids, the silver images, of course, being black in color.

The negative is then subjected, for just a few seconds, to a whitening intensification treatment with a very dilute mercuric chloride and potassium bromide combined solution. This treatment has the effect of turning the surface image into a complex mercurous-silver salt, white in color and readily visible as a positive white intensified image against the artificially supplied blue background. The underlying emulsion nearest the support remains black and negative (not positive) and can readily be copied, also by reflected light, as a negative, because the whitening on the other emulsion comes behind the black image and in combination with the blue dye renders it readily copyable. The color of the dye employed may be varied according to convenience and the type of film which is to be used in copying. The underlying negative image retains its own character and is strengthened for copying by the supplying of white in the white areas without alteration or changing of its intrinsic negative character. This method is to be differentiated from that employed when the interposed filter layer retains its color after development and fixation, the introduction of the blue dye treatment taking the place of the yellow filter layer.

It will be understood that while the discussion herein has been descriptive generally of motion picture film and processing from a cinematographic standpoint, this invention is not limited to cinematography but may be variously applied, without deviation from the disclosed principles, to still picture production in which the resulting positive prints, reproduced in color from the negative separations produced by this process are remarkably sharp and readily distinguished by their clearness and lack of flare from prints produced by known color printing methods from such film arrangements as tri-packs. The principles of this invention and the particular type of mono-pack and bi-pack films herein disclosed will also be of great value in the art of transmission of color photographs by electrical impulse, which may be more simply described as wire-photo transmission, and in aerial photography, where the clearness of the derived images makes the resulting color picture of infinitely greater value from a military standpoint.

Having thus described the invention, what we claim as new and desire to secure by Letters Patent of the United States is:

1. In a method of producing a multi-color photographic record, the step which comprises exposing from the same side two regions of photographic film having two sensitive layers arranged in superposition, the first layer nearest the lens being sensitive to blue and green but not to red, the second layer being effectively sensitive to red only, one region only being exposed through a yellow filter thereby recording a portion of the spectrum in said first layer of said region and another portion of the spectrum in said second layer, and the other region being exposed without any filter thereby recording a portion of the spectrum in said first layer and another portion of the spectrum in the second layer of said other region.

2. In a method of producing multi-color photographic records, the step which comprises exposing from the same side two regions of a mono-pack film having two sensitive layers arranged in superposition, the first layer nearest the lens being sensitive to blue and green but not to red, the second layer being effectively sensitive to red only, one region only being exposed through a yellow filter thereby recording a portion of the spectrum in said first layer of said region and another portion of the spectrum in said second layer, and the other region being exposed without any filter thereby recording a portion of the spectrum in said first layer and another portion of the spectrum in the second layer of said other region.

3. In a method of producing multi-color photographic records, the step which comprises exposing from the same side two regions of photographic film having two sensitive layers arranged in superposition on different supports, the first layer nearest the lens being sensitive to blue and green but not to red, the second layer being effectively sensitive to red only, one region only being exposed through a yellow filter thereby recording a portion of the spectrum in said first layer of said region and another portion of the spectrum in said second layer, and the other region being exposed without any filter thereby recording a portion of the spectrum in said first layer and another portion of the spectrum in the second layer of said other region.

4. In a method of producing multi-color photographs, the steps which comprise exposing from the same side two different regions of photographic film having two sensitive layers arranged in superposition, the first layer nearest the lens being sensitive to blue and green but not to red, the second layer being effectively sensitive to red only, one region only being exposed through a yellow filter thereby recording a portion of the spectrum in said first layer of said region and another portion of the spectrum in said second layer, and the other region being exposed without any filter thereby recording a portion of the spectrum in said first layer and another portion of the spectrum in the second layer of said other region, and utilizing the record of the first layer exposed through the yellow filter for positive printing in magenta, the record of the first layer exposed without a filter for positive printing in yellow and one of the records of the second layer for positive printing in blue.

5. In a method of producing multi-color photographic records, the steps which comprise exposing from the same side two regions of photographic film having two sensitive layers arranged in superposition on different supports, the first layer nearest the lens being sensitive to blue and green but not to red, the second layer being effectively sensitive to red only, one region only being exposed through a yellow filter thereby recording a portion of the spectrum in said first layer of said region and another portion of the spectrum in said second layer, and the other region being exposed without any filter thereby recording a portion of the spectrum in said first layer and another portion of the spectrum in the second layer of said other region, and utilizing the yellow filtered record of said first layer for positive printing in magenta, the unfiltered record of said first layer for positive printing in yellow and one of the records in said second layer for positive printing in blue.

EVA LOUISE V. HESSER.
EDWIN BOWER HESSER.